United States Patent
Prabhavalkar et al.

(10) Patent No.: US 11,423,883 B2
(45) Date of Patent: Aug. 23, 2022

(54) CONTEXTUAL BIASING FOR SPEECH RECOGNITION

(71) Applicant: Google LLC, Mountain View, CA (US)

(72) Inventors: Rohit Prakash Prabhavalkar, Santa Clara, CA (US); Golan Pundak, New York, NY (US); Tara N. Sainath, Jersey City, NJ (US)

(73) Assignee: Google LLC, Mountain View, CA (US)

(*) Notice: Subject to any disclaimer, the term of this patent is extended or adjusted under 35 U.S.C. 154(b) by 220 days.

(21) Appl. No.: 16/836,445

(22) Filed: Mar. 31, 2020

(65) Prior Publication Data
US 2020/0357387 A1    Nov. 12, 2020

Related U.S. Application Data

(60) Provisional application No. 62/843,824, filed on May 6, 2019.

(51) Int. Cl.
*G10L 15/16* (2006.01)
*G10L 15/26* (2006.01)

(52) U.S. Cl.
CPC .............. *G10L 15/16* (2013.01); *G10L 15/26* (2013.01)

(58) Field of Classification Search
CPC ....... G10L 15/16; G10L 15/26; G06N 3/0445; G06N 3/0454
See application file for complete search history.

(56) References Cited

PUBLICATIONS

Chan, William, et al. "Listen, attend and spell." arXiv preprint arXiv:1508.01211 (2015) (Year: 2015).*
Williams, Ian, et al. "Contextual Speech Recognition in End-to-end Neural Network Systems Using Beam Search." Interspeech. 2018. (Year: 2018).*
IEEE Signal Processing Society the organizing committee, ICASSP-2019 conferences papers are public available on Apr. 17, 2019. (Year: 2019).*
Vaswani, Ashish, et al. "Attention is all you need." Advances in neural information processing systems 30 (2017). (Year: 2017).*
Chiu, Chung-Cheng, et al. "State-of-the-art speech recognition with sequence-to-sequence models." 2018 IEEE International Conference on Acoustics, Speech and Signal Processing (ICASSP). IEEE, 2018. (Year: 2018).*

(Continued)

*Primary Examiner* — Jialong He
(74) *Attorney, Agent, or Firm* — Honigman LLP; Brett A. Krueger; Greant Griffith

(57) ABSTRACT

A method includes receiving audio data encoding an utterance and obtaining a set of bias phrases corresponding to a context of the utterance. Each bias phrase includes one or more words. The method also includes processing, using a speech recognition model, acoustic features derived from the audio to generate an output from the speech recognition model. The speech recognition model includes a first encoder configured to receive the acoustic features, a first attention module, a bias encoder configured to receive data indicating the obtained set of bias phrases, a bias encoder, and a decoder configured to determine likelihoods of sequences of speech elements based on output of the first attention module and output of the bias attention module. The method also includes determining a transcript for the utterance based on the likelihoods of sequences of speech elements.

28 Claims, 5 Drawing Sheets

(56) References Cited

PUBLICATIONS

International Search Report for the related application No. PCT/US2020/026004 dated Mar. 31, 2020.

Pundak Golan et al.: "Deep Context: End-to-end Contextual Speech Recognition", 2018 IEEE Spoken Language Technology Workshop (SLT), IEEE, Dec. 18, 2018 (Dec. 18, 2018), pp. 418-425, DOI: 10.1109/SLT.2018.8639034 [retrieved on Feb. 11, 2019 ].

Bruguier Antoine et al.: "Phoebe: Pronunciation-aware Contextualization for End-to-end Speech Recognition", ICASSP 2019—2019 IEEE International Conference on Acoustics, Speech and Signal Processing (ICASSP), IEEE, Apr. 17, 2019 (Apr. 17, 2019), pp. 6171-6175, DOI: 10.1109/ICASSP.2019.8682441 [retrieved on Feb. 4, 2019].

\* cited by examiner

CONTEXTUAL BIASING FOR SPEECH RECOGNITION

CROSS REFERENCE TO RELATED APPLICATIONS

This U.S. patent application claims priority under 35 U.S.C. § 119(e) to U.S. Provisional Application 62/843,824, filed on May 6, 2019. The disclosure of this prior application is considered part of the disclosure of this application and is hereby incorporated by reference in its entirety.

TECHNICAL FIELD

This disclosure relates to contextual biasing for speech recognition.

BACKGROUND

Recognizing the context of speech is challenging for automated speech recognition (ASR) systems given the wide variety of words that people may speak and the many variations in accents and pronunciation. In many cases, the types of words and phrases that a person speaks varies depending on the context the person finds himself or herself in.

Contextual automated speech recognition (ASR) involves biasing speech recognition towards a given context, such as towards a user's own playlist, contacts, or geographic place names. Context information usually includes a list of relevant phrases to be recognized, which often includes rare phrases or even foreign words which are seen infrequently in training. To perform contextual biasing, conventional ASR systems sometimes model contextual information in an independent contextual language model (LM), using an n-gram weighted finite state transducer (WFST), and compose the independent contextual LM with a baseline LM for on-the-fly (OTF) rescoring.

Recently, end-to-end (E2E) models have shown great promise for ASR, exhibiting improved word error rates (WERs) and latency metrics as compared to conventional on-device models. These E2E models, which fold the acoustic model (AM), pronunciation model (PM), and LMs into a single network to directly learn speech-to-text mapping, have shown competitive results compared to conventional ASR systems which have a separate AM, PM, and LMs. Representative E2E models include word-based connectionist temporal classification (CTC) models, recurrent neural network transducer (RNN-T) models, and attention-based models such as Listen, Attend, and Spell (LAS).

In an E2E, grapheme-only model, the predicted subword units output by the attender component are graphemes. In an E2E, wordpiece-only model, the predicted subword units output by the attender component are wordpieces, i.e., a set of common sub-word units. The output of the attention module is passed to the speller (or "decoder"), which is analogous to an LM, and which produces a probability distribution over a set of hypothesized words.

Because E2E models maintain a limited number of recognition candidates during beam-search decoding, contextual ASR can be challenging for E2E models. It can be particularly challenging for E2E grapheme-only models and E2E wordpiece-only models to spell out-of-vocabulary (OOV) words, particularly those classes of words that are virtually unseen in training.

SUMMARY

Implementations herein are directed toward a speech recognition model configured to bias the speech recognition process toward predetermined words and phrases that are relevant to a current context. The model can be an end-to-end model implemented with neural networks. The model can have audio processing components and contextual biasing components trained jointly, with audio-based encodings and embeddings for context n-grams optimized together. In use, the model can be presented with a set of context phrases, which might contain out-of-vocabulary (OOV) terms not seen during training. Compared to more traditional contextualization approaches, the proposed system can provide significant improvements to word error rate (WER), in some tests as much as 68% relative WER, indicating the advantage of joint optimization over individually trained components.

The set of context phrases used for biasing can be dynamically changed as the context changes. For example, the system can use text information (e.g., grapheme sequences) representing biasing phrases. Different sets of phrases can be used for different situations, and the sets of phrases can be personalized for the user. For example, when a user has mentioned the word "call" or has opened an application for calls or messaging, the system can select names from the user's contacts list as the context phrases for biasing. As another example, when a user has a media playing application open or is currently playing media, the list of context phrases for biasing may be the list of available songs or other media items, or related terms, from a media library of the user. The speech recognition system can determine an appropriate context based on context data indicating, for example, the user's contacts, calendar appointments, open applications, and location. From this context, the system can select an appropriate set of relevant phrases.

As will become apparent, dynamically incorporating contextual biasing into a neural network, ASR model can improve recognition of out-of-vocabulary terms and unusual phrases. Contextual phrases can be represented as a set of word n-grams. In some implementations, the neural network ASR model incorporating the contextual biasing includes a contextual Listen, Attend, and Spell (CLAS) model. The CLAS model is an encoder-decoder model that jointly optimizes the ASR components along with embeddings of the context n-grams. During inference, the CLAS model can be presented with a set of context phrases, which might contain OOV terms not seen during training. Feeding the model the set of context phrases provides a significant advantage, as the model does not require the number or content of the context phrases to be fixed at the time of training.

One aspect of the disclosure provides a method for incorporating contextual bias information into a speech recognition model for biasing speech recognition toward one or more predetermined terms/phrases. The method includes receiving, at data processing hardware, audio data encoding an utterance, and obtaining, by the data processing hardware, a set of bias phrases corresponding to a context of the utterance. Each bias phrase in the set of bias phrases includes one or more words. The method also includes processing, by the data processing hardware, using a speech recognition model, acoustic features derived from the audio data to generate an output from the speech recognition model. The speech recognition model includes: a first encoder and a corresponding first attention module; a bias encoder and a corresponding bias attention module; and a decoder configured to determine likelihoods of sequences of speech elements based on output of the first attention module and output of the bias attention module. The first encoder is configured to receive the acoustic features and the bias encoder is configured to receive data indicating the obtained set of bias phrases. The method also includes determining, by the data processing hardware, a transcript for the utterance based on the likelihoods of sequences of speech elements determined by the decoder.

Implementations of the disclosure may include one or more of the following optional features. In some implementations, the bias encoder is configured to encode a corresponding bias context vector for each bias phrase in the set of bias phrases, and the bias attention module is configured to compute attention over the bias context vectors. In these implementations, the bias attention module may be configured to receive an additional bias context vector that does not correspond to any of the bias phrases in the set of bias phrases. Here, the additional bias context vector represents an option to not bias the likelihoods of sequences of speech elements determined by the decoder toward any of the bias phrases. These implementations may additionally or alternatively include the bias encoder and the bias attention module configured to operate with a variable number of bias phrases in the set of bias phrases that are not specified during training of the speech recognition model.

The speech elements may include words, wordpieces, or graphemes. The set of bias phrases may include a set of contact names personalized for a particular user or a set of media item names.

In some examples, the first encoder, the first attention module, the bias encoder, the bias attention module, and the decoder are trained jointly to predict a sequence of graphemes from a sequence of acoustic feature frames. In some configurations, the first encoder includes a stacked, recurrent neural network (RNN) and/or the decoder includes a stacked, unidirectional RNN configured to compute a probability of a sequence of output tokens.

In some implementations, the first attention module is configured to compute attention as a function of a previous hidden state of the decoder and a full sequence of context vectors output by the first encoder for the utterance, and the bias attention module is configured to compute attention as a function of the previous hidden state of the decoder and a full sequence of context vectors representing the bias phrases in the set of bias phrases. In additional implementations, the decoder is configured to determine a hidden state based on: an embedding vector for a previous grapheme output from the speech recognition model; a previous hidden state of the decoder; an audio context vector output by the first attention module; and a bias context vector output by the bias attention module.

In some examples, the method also includes obtaining, by the data processing hardware, a list of bias prefixes corresponding to the bias phrases in the set of bias phrases, and determining, by the data processing hardware, using the speech recognition model, whether a partial transcript for the utterance includes one of the bias prefixes in the list of bias prefixes. Here, each bias prefix in the list of bias prefixes represents an initial portion of one or more of the bias phrases in the set of bias phrases. In these examples, when the partial transcript for the utterance includes one of the bias prefixes, the method also includes: identifying, by the data processing hardware, a subset of one or more bias phrases in the set of bias phrases that include the one of the bias prefixes included in the partial transcript; and enabling, by the data processing hardware, only the identified subset of the one or more bias phrases for biasing the speech recognition model. In other examples, the method also includes: obtaining, by the data processing hardware, a list of bias prefixes corresponding to the bias phrases in the set of bias phrases, each bias prefix in the list of bias prefixes representing an initial portion of one or more of the bias phrases in the set of bias phrases; and adjusting, by the data processing hardware, bias-attention probabilities of the bias attention module for encoding outputs of the bias encoder for the bias phrases in the set of bias phrases based on whether one or more of the bias prefixes in the list of bias prefixes are included in a partial transcription for the utterance. At least one bias prefix in the list of bias prefixes includes a first word of a corresponding bias phrase in the set of bias phrases and excludes a last word of the corresponding bias phrase.

Another aspect of the disclosure provides a system that incorporates contextual bias information into a speech recognition model for biasing speech recognition toward one or more predetermined terms/phrases. The system includes data processing hardware and memory hardware in communication with the data processing hardware and storing instructions that when executed on the data processing hardware cause the data processing hardware to perform operations. The operations include receiving audio data encoding an utterance and obtaining a set of bias phrases corresponding to a context of the utterance. Each bias phrase in the set of bias phrases includes one or more words. The operations also include processing, using a speech recognition model, acoustic features derived from the audio data to generate an output from the speech recognition model. The speech recognition model includes: a first encoder and a corresponding first attention module; a bias encoder and a corresponding bias attention module; and a decoder configured to determine likelihoods of sequences of speech elements based on output of the first attention module and output of the bias attention module. The first encoder is configured to receive the acoustic features and the bias encoder is configured to receive data indicating the obtained set of bias phrases. The operations also include determining a transcript for the utterance based on the likelihoods of sequences of speech elements determined by the decoder.

This aspect may include one or more of the following optional features. In some implementations, the bias encoder is configured to encode a corresponding bias context vector for each bias phrase in the set of bias phrases, and the bias attention module is configured to compute attention over the bias context vectors. In these implementations, the bias attention module may be configured to receive an additional bias context vector that does not correspond to any of the bias phrases in the set of bias phrases. Here, the additional bias context vector represents an option to not bias the likelihoods of sequences of speech elements determined by the decoder toward any of the bias phrases. These implementations may additionally or alternatively include the bias encoder and the bias attention module configured to operate with a variable number of bias phrases in the set of bias phrases that are not specified during training of the speech recognition model.

The speech elements may include words, wordpieces, or graphemes. The set of bias phrases may include a set of contact names personalized for a particular user or a set of media item names.

In some examples, the first encoder, the first attention module, the bias encoder, the bias attention module, and the decoder are trained jointly to predict a sequence of graphemes from a sequence of acoustic feature frames. In some configurations, the first encoder includes a stacked, recurrent neural network (RNN) and/or the decoder includes a stacked, unidirectional RNN configured to compute a probability of a sequence of output tokens.

In some implementations, the first attention module is configured to compute attention as a function of a previous hidden state of the decoder and a full sequence of context vectors output by the first encoder for the utterance, and the bias attention module is configured to compute attention as a function of the previous hidden state of the decoder and a full sequence of context vectors representing the bias phrases in the set of bias phrases. In additional implementations, the decoder is configured to determine a hidden state based on: an embedding vector for a previous grapheme output from the speech recognition model; a previous hidden state of the decoder; an audio context vector output by the first attention module; and a bias context vector output by the bias attention module.

In some examples, the operations also include obtaining a list of bias prefixes corresponding to the bias phrases in the set of bias phrases, and determining, using the speech recognition model, whether a partial transcript for the utterance includes one of the bias prefixes in the list of bias prefixes. Here, each bias prefix in the list of bias prefixes represents an initial portion of one or more of the bias phrases in the set of bias phrases. In these examples, when the partial transcript for the utterance includes one of the bias prefixes, the operations also include: identifying a subset of one or more bias phrases in the set of bias phrases that include the one of the bias prefixes included in the partial transcript; and enabling only the identified subset of the one or more bias phrases for biasing the speech recognition model. In other examples, t the operations also include: obtaining a list of bias prefixes corresponding to the bias phrases in the set of bias phrases, each bias prefix in the list of bias prefixes representing an initial portion of one or more of the bias phrases in the set of bias phrases; and adjusting bias-attention probabilities of the bias attention module for encoding outputs of the bias encoder for the bias phrases in the set of bias phrases based on whether one or more of the bias prefixes in the list of bias prefixes are included in a partial transcription for the utterance. At least one bias prefix in the list of bias prefixes includes a first word of a corresponding bias phrase in the set of bias phrases and excludes a last word of the corresponding bias phrase.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
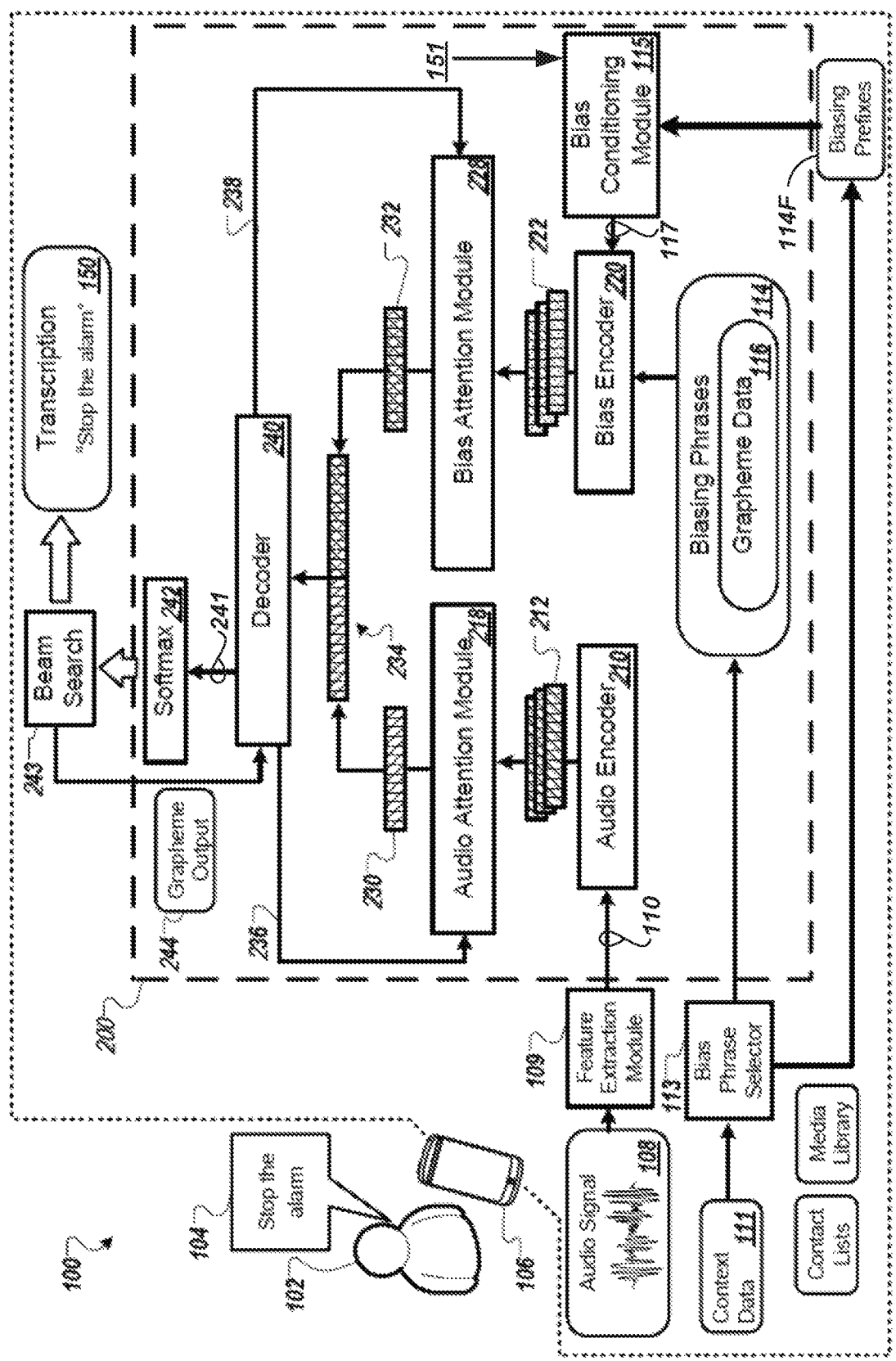
FIG. 1 is a schematic view of an example speech recognizer that incorporates contextual biasing to improve speech recognition.

As speech technologies become increasingly pervasive, speech is emerging as one of the main input modalities on mobile devices and in intelligent personal assistants. Accuracy of an automated speech recognition (ASR) model can be improved when the ASR model incorporates information about a current context in which an utterance is spoken into the recognition process. Examples of such context include the dialog state (e.g., we might want "stop" or "cancel" to be more likely when an alarm is ringing), the speaker's location (which might make nearby restaurants or locations more likely), as well as personalized information about the user such as her contacts or song playlists. In particular, providing phrases to the ASR model that are known to be relevant to the current context can significantly improve accuracy for recognizing uncommon words or words that were not included in training examples. Implementations herein are directed toward incorporating contextual biasing functionality into an end-to-end (E2E) speech recognition model that combines, into a single model, the functions traditionally performed by each of the following separately trained models: an acoustic model (AM), a language model (LM), and a pronunciation model (PM). Specifically, the E2E speech recognition model can receive contextual phrases represented as a set of word n-grams during inference (e.g., the use of the model to predict content of speech), in which some of the contextual phrases might contain out-of-vocabulary terms not included in training examples used to train the model.

In traditional ASR systems, one of the dominant paradigms for incorporating such information involves the use of an independently-trained on-the-fly (OTF) rescoring framework which dynamically adjusts the LM weights of a small number of n-grams relevant to the particular recognition context. Extending such techniques to sequence-to-sequence models is important for improving system performance, and is an active area of research. While some approaches apply the use of an external independently-trained LM to sequence-to-sequence models for OTF rescoring, many of the benefits derived from the joint optimization of components of a sequence-to-sequence model are lost.

The E2E speech recognition model incorporating the contextual biasing may include a contextual Listen, Attend, and Spell (CLAS) model that does not use any external independently-trained models for OTF rescoring and instead generates a context embedding for each contextual phrase fed to the model. For example, the CLAS model may include a bias encoder that receives each contextual phrase, represented as a sequence of graphemes, as input, and individually generates, as output, a corresponding fixed-dimensional representation for the contextual phrase as a bias embedding. The CLAs model may then employ a bias attention mechanism to summarize the available context at each step of the model's output predictions. The bias attention mechanism operates over the full sequence of bias embeddings that represent the relevant contextual phrases. In this manner, the number of contextual phrases, the length of the contextual phrases, and the content of the contextual phrases can vary dynamically over time and does not need to be set at the time the model is trained. The approach allows for easy incorporation of out-of-vocabulary terms using a variable number of contextual phrases during inference. The technique requires neither the particular context information to be available at training time nor the careful tuning of rescoring weights.

An example of a type of context that can be used to select contextual phrases for biasing includes a dialog state of an application or conversation with a digital assistant. Other signals or factors can similarly provide context that signals which terms may be most relevant. For example, when an alarm is ringing, the words "stop" or "cancel" may be more likely. Another example context is the speaker's location, which might make the names of nearby stores, restaurants, or other locations more likely. Additional context information can be personalized information about the user such as his or her contacts or song playlists.

Referring to FIG. 1, an example ASR system 100 includes a speech recognition model 200 that incorporates contextual biasing to bias the speech recognition process toward predetermined words and phrases that are relevant to a current context in which an utterance is spoken. The speech recognition model 200 includes an audio encoder 210, a bias encoder 220, an audio attention module 218, a bias attention module 228, and a decoder 240 that receives, as input, the outputs of both attention modules 218, 228. The output of the decoder 240 is further normalized with a softmax layer 242 that may provide a probability distribution over a set of language units, such as a set of graphemes. For example, the output for the softmax layer 242 can be a vector having a probability value for each of the graphemes in a language, as well as potentially for other symbols (e.g., punctuation, space, etc.). The sequence of vectors from the softmax layer 242 is used to produce a transcription 150 of a speech utterance 104 recorded by the device 106. For example, a beam search module 243 may determine a sequence of graphemes that make up the transcription 150. In some examples, the speech recognition model 200 resides on a user device 106 associated with a user 102. In other examples, the speech recognition model 200 resides on a remote server in communication with the user device 106 or functionality of the speech recognition model 200 is split among the remote server and the user device 106.

In the example shown, the user 102 speaks an utterance 104 captured by one or more microphones of the user device 106. The user device 106 may include a mobile device, such as a smart phone, tablet, smart headphones, smart watch, etc. The utterance 104 spoken by the user 102 may be a command, "Stop the alarm", in which the one or more microphones generates an audio signal 108 from the spoken command. The audio signal 108 can be processed in any of various ways to determine inputs for the neural network elements of the speech recognition model 200. For example, a feature extraction module 109 can generate acoustic features 110 from the audio signal, such as Mel-frequency cepstral components for different windows or frames of the audio signal 108.

The speech recognition model includes two different encoder/attention paths/branches that operate on different types of input. For instance, the audio encoder 210 and audio attention module 218 process acoustic information, while the bias encoder 220 and the bias attention module 228 process information about contextually-relevant terms (e.g., words or phrases). More specifically, the audio encoder 210 receives the acoustic features 110 extracted by the feature extraction module 109 that represent the acoustic properties of the utterance 104 and the bias encoder 220 receives input representing different bias phrases.

In some implementations, the user device obtains context data 111 indicating information about a current context. Here, the context data can indicate factors such as a physical state of the user device 106, the operating state of the user device 106, recent inputs or tasks of the user 102, and so on. In one example, the context data 111 indicates a location of the user device 106, applications installed and/or executing on the user device 106, and upcoming calendar appointments for the user 102. For instance, the context data 111 may include an open clock app, and a time of day, indicating that it is early morning. The context data 111 may indicate that the device 106 is at the user's home, and that upcoming calendar appointments include a meeting occurring in one hour. The context data 111 in this example indicates that the user is likely at home early in the morning, waking up to his or her alarm from the clock app, in order to get to a meeting on time.

From the context data 111, the user device 106 selects a set of contextual bias phrases 114 that are predicted to be relevant for the current context. These phrases 114 can be selected by a bias phrase selector 113 that interprets the context data 111 and compiles a list of phrases. The bias phrase selector 113 may determine a classification or category for the current context, such as selecting whether the context data 111 most likely represents playing media, initiating a call, dictating a message, issuing a voice command, and so on. From these classifications, or from the context data 111 directly, the bias phrase selector 113 compiles a list of phrases 114 that are likely to be spoken. In the illustrated example, the bias phrase selector 113 determines that a voice command is likely, and so the bias phrase selector 113 provides a set of contextual bias phrases 114, 114a-n that includes commands such as "turn on the lights," "stop the alarm," and so on.

With continued reference to FIG. 1, the speech recognition model 200 receives the set of contextual bias phrases 114 as context information. The speech recognition model 200 permits the receiving and processing of a variable number of contextual biasing phrases 114 of variable length. Here, the bias encoder 220 receives each bias phrase 114 in the set as a corresponding sequence of graphemes 116 (e.g., grapheme data) and generates a corresponding fixed-dimensional representation, referred to as a bias vector 222 or bias embedding, for each bias phrase 114. That is, the bias encoder 220 generates each bias vector 222 one at a time based on the sequence of graphemes 116 in the corresponding bias phrase 114.

When large numbers of biasing phrases 114 are available, selecting meaningful bias information can be challenging. In some examples, to improve the effectiveness of the contextual biasing function, a bias conditioning module 115 may optionally activate the biasing phrases selectively, so that only a proper subset of the biasing phrases 114 are active at a given time. With this technique, a biasing phrase 114 may be enabled only when a related biasing prefix is detected on the partially decoded hypothesis/transcription on the beam search beam. The bias conditioning module 115 can be part of the speech recognition model 200 or a separate component.

The bias conditioning module 115 may use partial, intermediate, or preliminary transcription information for the utterance 104 to effectively filter out biasing phrases 114 that are not meaningful at a current time step, thereby limiting the possibility for distraction or confusion in attending to bias vectors 222 at the bias attention module 228. In some examples, for each bias phrase 114, the bias phrase selector 113 provides a corresponding bias prefix 114F to the bias conditioning module 115 that represents an initial portion of the bias phrase 114. Accordingly, the bias conditioning module 115 may compare each bias prefix 114F to the current partial transcription 151 and determine whether or not the current partial transcription 151 includes the bias prefix 114F. When the partial transcription 151 includes the bias prefix 114F, the bias conditioning model 115 may activate/enable the corresponding bias phrase 114. For instance, in the given example for the bias phrase 114 "stop the alarm", the bias phrase selector 113 may provide the corresponding bias prefix 114F of "stop" (or "stop the") to the bias conditioning module 115 for conditioning activating/enabling of the bias vector 122 for the phrase 114 when the current partial transcription 151 includes the bias prefix 114F.

The bias conditioning module 115 may also disable or penalize bias phrases 114 that correspond to bias prefixes 114F not included in the current partial transcription 151. A disabled or penalized bias phrase 114 may be adjusted by indicating a reduced probability for the bias phrase 114, or by altering the bias vector 222 for the phrase 114 or providing a no-bias input 117 causing the bias encoder 220 to encode the bias vector 222 for the phrase 114 differently. Other techniques may also be used, such as removing phrases 114 from the set of biasing phrases 114 or removing bias vectors 222 from the set operated on by the bias attention module 228.

With continued reference to FIG. 1, the bias attention module 228 processes the bias vectors 222 output from the bias encoder 220 and a decoder context state 238 from a previous time step to generate a bias attention vector 232. The decoder context state 238 includes the state of the decoder 240 at the previous time step with respect to the previous bias attention vectors 232. The decoder context state 238 may represent a portion of the output of the decoder 240, such as a designated subset of the outputs of the decoder 140. The decoder context state 238 informs the contextual bias attention module 228 of the relative importance of the bias vector 222 input to the bias attention module 228 at the current time step. Thus, as the decoder context state 238 changes, the bias attention module 228 calculates a different summary or aggregation of the bias vectors 222, thus changing the probabilities that the decoder will indicate for elements of the different biasing phrases 114.

No referring to the acoustic processing branch of the speech recognition model 200, audio vectors 212 output by the audio encoder 210 are provided to the audio attention module 218, which generates an audio attention vector 230. The audio attention vector 230 provides a weighted summary of the audio frames to which the attention module 218 is currently attending, e.g., the sequence of previous audio vectors 212 of the utterance 104 so far. The audio encoder 210 can generate an audio vector 212 for each window or frame of audio data 108 as additional acoustic features are received, and so continues to provide additional audio vectors 212 as more audio is received. In some examples, the audio attention module 218 computes attention weights over the sequence of audio vectors 212 using a decoder audio state 236 from a previous time step and the encoded audio vector 212. The decoder audio state 236 may represent a portion of the state of the decoder 240 when outputting the most recent decoder output, e.g., a portion of the decoder state for the previous time step representing the immediately previous window or frame of audio. The decoder state 236 helps inform the audio attention module 218 of the relative importance of the audio vector 212 input to the audio attention module 218 at the current time step. The decoder audio state 336 can be a portion of the output of the decoder 340, such as a designated subset of the outputs of the decoder 240, typically a different set of outputs than used in the decoder context state 338. In some implementations, the state vectors 236, 238 represent non-overlapping portions of the output of the decoder 140. In other implementations, the state vectors 236, 238 include one or more overlapping sections or both state vectors 236, 238 each represent the whole output of the decoder 240.

The outputs of both attention modules 218, 228 are provided to the decoder 240. For example, the audio attention vector 230 and the context attention vector 232 may be concatenated to produces a combined vector 234 that serves as input to the decoder 240. This concatenation injects biasing into the speech recognition model 200, and the decoder 240 jointly processes the biasing information with the acoustic information. The decoder 240 can be a sequence model such as a long short-term memory (LSTM) neural network. As discussed above, state vectors 236, 238 representing respective portions of the states of the decoder 240 are fed back to the audio attention module 218 and contextual biasing attention module 228 to be used in computing the next attention vectors 230, 232. The output of the decoder 240 is normalized with the softmax layer 242 to produce a probability distribution over a set of output targets, which are graphemes in the illustrated example. In other examples, the set of output targets in the probability distribution may include wordpieces or phonemes. The various output vectors from the decoder 240 are provided to a beam search module 243 which uses beam search to produce the transcription 150 for the utterance 104. The decision made about which grapheme represents the audio at the current time step is fed back to the decoder 140 as a grapheme output 244 and is used to compute the next decoder output 241.

The user device 106 can use the transcription 150 output from the beam search module 243 in any of a variety of ways. For example, depending on the manner in which the user 102 invoked the speech recognition functionality, the user device 106 may identify and execute a command specified by the transcription 150, display the transcription 150, provide the transcription 150 to another system (e.g., such as a server system over a network), provide the transcription 150 to an application on the mobile device 106, and so on.

In the example in FIG. 1, the context information of the user's location, open apps, and upcoming calendar appointment biases the speech recognition model 200 to the biasing phrase 114 "stop the alarm," which is the same phrase the user spoke in the utterance 104. The user device 106 (or alternately a server system when the server system executes the speech recognition model 200) thus correctly transcribes the user's command as "stop the alarm." The user device 106 can then perform an action based on this transcription, such as turning off the alarm of an alarm clock application.

Figure 2:
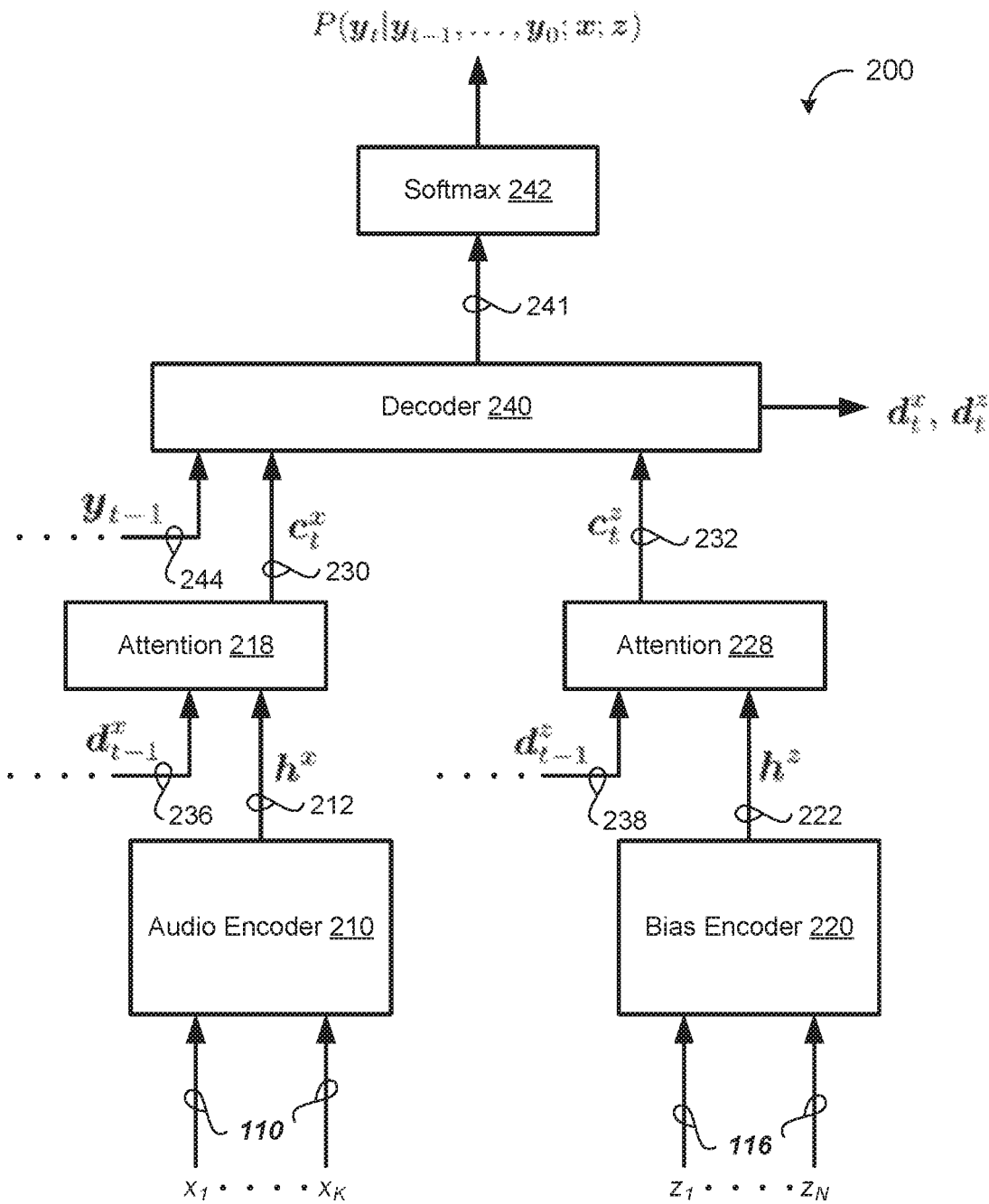
FIG. 2 is a schematic view of an example architecture of a speech recognition model for contextual biasing.

FIG. 2 illustrates an example contextual listen, attend, and spell (CLAS) model architecture for the speech recognition model 200 incorporating contextual biasing. The CLAS model architecture 200 is an all-neural mechanism which can leverage contextual information—provided as a list of contextual bias phrases 114 (FIG. 1)—to improve recognition performance. The technique consists of first embedding each phrase, represented as a sequence of graphemes 116, into a fixed-dimensional representation 222, and then employing an attention module 228 to summarize the available context 232 at each step of the model's output predictions. This approach allows for a variable number of contextual phrases during inference. Moreover, the techniques disclosed herein do not require that the particular context information be available at training time, and importantly, unlike some prior systems, the method does not require careful tuning of rescoring weights, while still being able to incorporate out-of-vocabulary (OOV) terms.

In experimental evaluations, the CLAS model 200— which trains the contextualization components jointly with the rest of the model—significantly outperforms online rescoring techniques when handling hundreds of context phrases, and is comparable to these techniques when handling thousands of phrases. First, the standard LAS model will be described, with the standard contextualization approach. Then, proposed modifications to the LAS model in order to obtain the CLAS model 200 are described.

The LAS architecture includes three main components: an encoder 210, a decoder 240, and an attention network 218. The three main components are trained jointly to predict a sequence of graphemes 244 from a sequence of acoustic feature frames 110. The encoder 210 includes a stacked recurrent neural network (RNN) (unidirectional, in this work) that reads acoustic features 110, $x=(x_1, \ldots, x_K)$, and outputs a sequence of high-level features (hidden states) 212, $h^x=(h_1^x, \ldots, h_K^x)$. The encoder 210 is similar to the acoustic model in an ASR system.

The decoder 220 a stacked unidirectional RNN that computes the probability of a sequence of output tokens (characters in this work) 241, $y=(y_1, \ldots, y_T)$ as follows:

$$P(y \mid x) = P(y \mid h^x) = \prod_{t=1}^{T} P(y_t \mid h^x, y_0, y_1, \ldots, y_{t-1}) \quad (1)$$

The conditional dependence on the encoder state vectors 212, $h^x$, is modeled using a context vector 230, $c_t=c_t^x$, which is computed using multi-head-attention as a function of the current decoder hidden state, $d_t$, and the full encoder state sequence, $h^x$. The hidden state of the decoder, $d_t$, which captures the previous character context $y<t$, is given by:

$$d_t = \text{RNN}(\tilde{y}_{t-1}, d_{t-1}, c_{t-1}) \quad (2)$$

where $d_{t-1}$ is the previous hidden state of the decoder, and $\tilde{y}_{t-1}$ is an embedding vector for $y_{t-1}$. The posterior distribution of the output 241 at a time step t is given by:

$$P(y_t \mid h^x, y_{<t}) = \text{softmax}(W_s[c_t; d_t] + b_s). \quad (3)$$

where $W_s$ and $b_s$ are again learnable parameters, and $[c_t; d_t]$ represents the concatenation of the two vectors. The model is trained to minimize the discriminative loss:

$$L_{LAS} = -\log P(y \mid x) \quad (4)$$

On-the-fly (OTF) rescoring is an approach for adjusting weights of n-grams relevant to a particular context. This technique, in each of its variations below, can be used with the LAS model or the CLAS model 200 discussed below. In OTF rescoring, a set of word-level biasing phrases are assumed to be known ahead of time, and compiled into a weighted finite state transducer (WFST). The word-level WFST, G, is then left-composed with a "speller" FST, S, which transduces a sequence of graphemes/wordpieces into the corresponding word. The contextual language model is obtained by: $C=\min(\det(S \circ G))$.

Figure 3A:
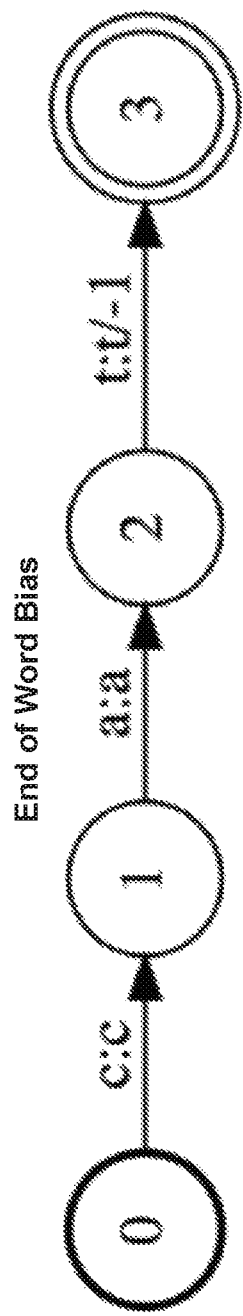
FIGS. 3A-3C are schematic views depicting different techniques for on-the-fly rescoring of context bias phrases.
Figure 3B:
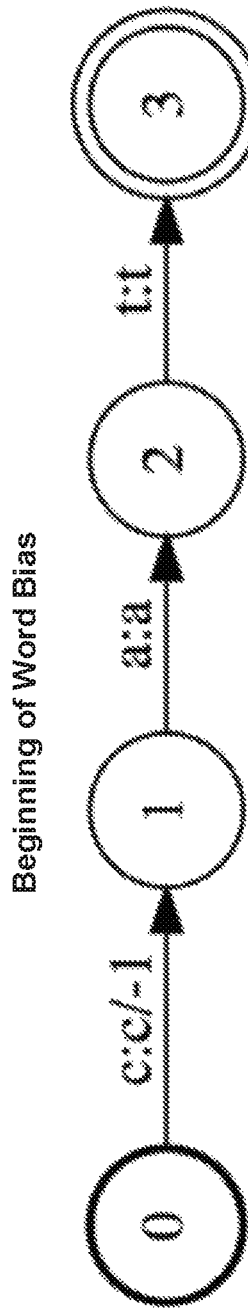
Figure 3C:
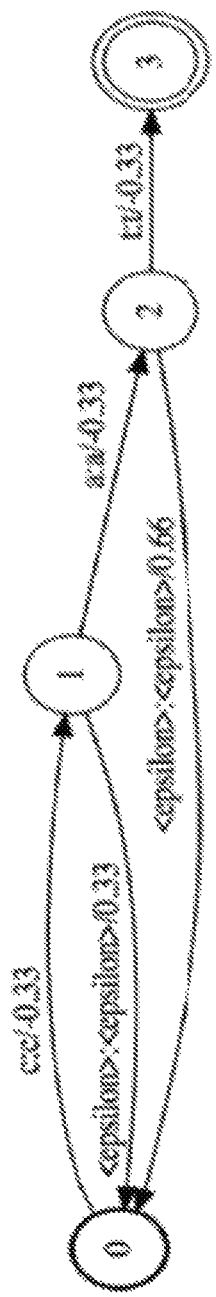

The scores from the contextualized language model, $P_C(y)$, can then be incorporated into the decoding criterion. This is done by augmenting the standard log-likelihood term with a scaled contribution from the contextualized language model:

$$y^* = \arg\max_y \log P(y \mid x) + \lambda \log P_C(y) \quad (5)$$

where $\lambda$ is a tunable hyperparameter controlling how much the contextual language model influences the overall model score during beam search FIGS. 3A-3C illustrate different techniques for OTF rescoring context bias phrases 114 by assigning weights to subword units. FIG. 3A depicts an example OTF rescoring technique in which no weight pushing is applied resulting in application of the overall score using Equation 5 at word boundaries. Thus, this technique only improves OTF rescoring performance when the relevant word does first appear in the beam. Moreover, while this technique works reasonably well when the number of context bias phrases is small (e.g., yes, no, cancel), the technique is prohibitive when the set of contextual phrases contains a large number of proper nouns (e.g., song names, contacts, etc.).

FIG. 3B depicts an example OTF rescoring technique that applies weight pushing resulting in application of the overall score to the beginning subword unit of each word. Applying the score only to the beginning subword unit might cause over-biasing problems, as words might artificially be boosted early on.

FIG. 3C depicts a third OTF rescoring technique that pushes weights to each subword unit of the word. To avoid artificially giving weight to prefixes which are boosted early on but do not match the entire phrase, a subtractive cost is included, as indicated by the negative weights shown in FIG. 3C. By pushing the wegiths to each subword unit of the word, the OTF rescoring technique of FIG. 3C aims to help keep the word on the beam.

Referring back to FIG. 2, the CLAS model 200 modifies the LAS model by using additional context through a list of provided bias phrases 114, z, thus effectively modeling P(y|x; z). The individual elements in z represent phrases such as personalized contact names, song lists, etc., which are relevant to the particular recognition context. In the example shown, the CLAS model 200 has access to a list of additional sequences of biasing phrases 114, denoted as $z=z_1, \ldots, z_N$. The individual elements in z represent phrases such as personalized contact names, song lists, etc., which are relevant to the particular recognition context. The purpose of the biasing phrases 114 is to bias the model towards outputting particular phrases. However, not all biasing phrases are necessarily relevant given the current utterance, and it is up to the model to determine which phrases, if any, might be relevant and to use these to modify the target distribution $P(y_t \mid h^x, y<t)$.

The bias encoder 220 embeds the biasing phrases 114 ($z=z_1, \ldots, z_N$) into a set of vectors 222, $h^z=\{h_0^z, h_1^z, \ldots, h_n^z\}$. The superscript z distinguishes bias-attention variables from audio-related variables. A vector $h_i^z$ is an embedding of $z_i$ if i>0. Since the bias phrases 114 may not be relevant for the current utterance, an additional learnable vector, $h_0^z=h_{nb}^z$, is added. The learnable vector $h_0^z$ corresponds to the no-bias input 117 (FIG. 1), and does not use any of the biasing phrases to produce the output. This option enables the model to back off to a "bias-less" decoding strategy when none of the biasing phrases match the audio, and allows the model to ignore the biasing phrases altogether.

In some examples, the bias encoder 220 includes a multilayer LSTM network configured to receive to receive the sequence of embeddings of subwords in $z_i$, which are the same grapheme or word-piece units used by the decoder, to obtain the embedding using the last state of the LSTM as the embedding of the entire phrase.

The bias attention module 228 computes bias attention over $h^z$. A secondary context vector summarizes z at time step t as follows:

$$u_{it}^z = v^{zT} \tan h(W_h^z h_i^z + W_d^z d_t + b_a^z) \quad (6)$$

$$\alpha_t^z = softmax(u_t^z) \quad c_t^z = \sum_{i=0}^{N} \alpha_{it}^z h_i^z \quad (7)$$

The bias attention module 228 outputs the bias context vector 232, $c_t^z$, which is concatenated with the audio context vector 230, $c_t^x$, to provide concatenated context vector 234 (FIG. 1), $c_t$, as input to the decoder 240, in which $c_t = [c_t^x; c_t^z]$ is the concatenation of context vectors obtained with respect to x and z. In some implementations, the other components of the CLAS model 200 that are unrelated to context biasing, (e.g., decoder and audio-encoder) are identical to the corresponding components in the standard LAS model, although these components will have significantly different training states as a result of joint training with the context biasing elements.

Accordingly, the CLAS model 200 explicitly models the probability of seeing a particular biasing phrase 114 given the audio features 110 and previous outputs 241, 244. Here, the probability $\alpha_t^z$ corresponds to a bias attention probability that may be expressed as follows:

$$\alpha_t^z = P(z_t|d_t) = P(z_t;x;y_{<t}) \quad (8)$$

Moreover, the CLAS model 200 may be trained to minimize loss based on the following equation:

$$L_{CLAS} = -\log P(y|x,z) \quad \text{(Equation 9)}$$

With reference to FIGS. 1 and 2, during training of each batch, the CLAS model 200 randomly generates the list of bias phrases, z, to allow for flexibility at inference time since the model 200 does not make any assumption about what biasing phrases 114 will be used during inference. In some examples, the CLAS model 200 randomly creates/generates the list of training bias phrases 114 from reference transcripts associated with utterances in the training batch by taking a list of reference transcripts, $r_1, \ldots, r_{N_{batch}}$, corresponding to the audio features 110 in a training batch, and randomly selects a list of bias phrases 114, z, of n-gram phrases 116 that appear as substrings in some of the reference transcripts.

In some examples, training the CLAS model 200 to exercise the no-bias option, in which a particular bias phrase 114, z, does not match some of the utterances in the batch, includes discarding/excluding each reference from the creation process with probability $P_{keep}$. When a reference is discarded, the utterance is still kept in the batch, but no biasing phrases are extracted from its transcript. If $P_{keep}$ is set to $P_{keep}=0$, no biasing phrases are presented to the training batch. If $P_{keep}=1$, each utterance in the batch has at least one matching biasing phrase. Next, from each kept reference, the training process randomly selects k word n-grams by randomly picking k uniformly from $[1, N_{phrases}]$ and randomly picking n uniformly from $[1, N_{order}]$. Here, $P_{keep}$, $N_{phrases}$, and $N_{order}$ are hyperparameters of the training process. For example, if $P_{keep}=1.0$, $N_{phrases}=1$, $N_{order}=1$, one unigram is selected from each reference transcript. In one example, setting $P_{keep}=0.5$, $N_{phrases}=1$, and $N_{order}=4$ promotes robustness to the no-bias and leads to a list of bias phrases 214 with an expected size of 17 (e.g., half of a shard size, plus one for no-bias).

In some implementations, the training process computes the intersection of z with each reference transcript r after randomly generating the list of bias phrases 114, z, such that the training process inserts a special </bias> symbol every time a match is found. For example, if the reference transcript is "play a song," and the matching biasing phrase is "play," the target sequence is modified to "play </bias> a song." The purpose of the </bias> symbol is to introduce a training error which can be corrected only by considering the correct biasing phrase. To be able to predict </bias>, the model 200 has to attend to the correct biasing phrase, thus ensuring that the bias encoder 220 receives updates during the training process.

During inference, when the user 102 provides the model 200 with a sequence of audio feature vectors 110, x, and a set of context bias phrase sequences, z, possibly never seen in training, the model 200 uses the bias encoder 220 to embed z into $h^z$. This embedding can take place before audio streaming begins. The sequence of audio feature vectors 110, x, can be represented as a sequence of frames fed into the audio encoder 210, and the decoder 240 is run to produce N-best hypotheses using beam search decoding (e.g., at the beam search module 243 of FIG. 1) to produce the transcript 150.

As mentioned previously, retrieving a meaningful bias context vector 232, $c_t^z$, may be challenging when the user 102 presents thousands of phrases 114 to the CLAS model 200 since the bias context vector 232 corresponds to a weighted sum of many different bias embeddings, z, and therefore, might be far from any context vector seen during training. To alleviate this problem, bias conditioning provides the model 200 both a list of bias phrases, $z=z_1, \ldots, z_N$, as well as a list of biasing prefixes 114F, $p=p_1, \ldots, p_N$ during inference. Here, the bias conditioning enables a biasing phrase $z_i$ at step t only when a corresponding biasing prefix $p_i$ is detected in the partially decoded hypothesis (e.g., partial transcript 151) on the beam $y<t$. This is accomplished by updating the bias attention probabilities by setting:

$$m_{it} = \begin{cases} 0 & \text{if } p_i \subseteq y_{<t} \\ \infty & \text{otherwise} \end{cases} \quad \text{(Equation 10)}$$

$$\alpha_t^z = softmax(u_t^z - m_t) \quad \text{(Equation 11)}$$

where $\subseteq$ is string inclusion.

Biasing conditioning may arbitrarily construct the list of biasing prefixes 114F. For instance, the biasing phrase "the cat sat" can be conditioned on the biasing prefix 114F "the cat". Here, biasing conditioning only enables an embedding, z, for the bias phrase 114 "the cat sat" once the model 200 detects the bias prefix 114F "the cat" in the partial transcript 151 on the beam $y<t$. A good choice of bias prefixes 114F alleviates overloading of bias attention at the bias attention module 228 by minimizing the number of bias phrases 114 sharing the same prefix, while at the same time allowing for distinctive bias embeddings, z, by preventing the splitting of each bias phrase 114 into too many segments. In some implementations, an algorithm selects the bias prefixes 114F by starting from empty prefixes ($p_i=\epsilon$) and iteratively extending each prefix by one word (from $z_i$) as long as the same prefix 114F is not shared by too many phrases 114.

An example training setup uses an approximately 25,000-hour training set consisting of 33 million English utterances. The training utterances are anonymized and hand-transcribed. This data set is may be augmented by artificially corrupting clean utterances using a room simulator and adding varying degrees of noise and reverberation such that the overall SNR is between 0 dB and 30 dB, with an average SNR of 12 dB.

The models are trained on 8×8 tensor processing units (TPU) slices with global batch size of 4,096. Each training core operates on a shard-size of 32 utterances in each training step. From this shard, biasing phrases are randomized and thus each shard sees a maximum of 32 biasing phrases during training.

The example training process uses 80-dimensional log-mel acoustic features 100 computed every 10 ms over a 25 ms window. Three consecutive frames are stacked and strided by a factor of three. This downsampling enables the use of a simpler encoder architecture.

The architecture of the encoder 210 may include ten (10) unidirectional LSTM layers, each with 256 nodes. In some examples, the encoder attention module 218 computes attention over 512 dimensions, using four (4) attention heads. Additionally, the bias encoder 220 may include single LSTM layer with 512 nodes, and the bias attention module 228 may compute attention over 512 dimensions. The decoder 240 may include four (4) LSTM layers with 256 nodes. In total, the model 200 may have about 58 million trainable parameters.

On test sets of utterances having hundreds of bias phrases 114 associated with high rates of out-of-vocabulary (OOV) words, the CLAS model 200 performs significantly better than non-contextual ASR models. However, the CLAS model 200 degrades for test sets having thousands of bias phrases 114 since correlations begin to appear between respective embeddings, z. This scalability issue can be addressed with bias conditioning by providing lists of bias prefixes 114F such that the CLAS model 200 only "enables" bias phrases 114 when the model 200 detects a corresponding prefix 114F in the partially decoded hypothesis (e.g., partial transcript 151) on the beam y<t.

Tests involving the use of the class CLAS model with bias-conditioning created bias prefixes in a rule-based manner. For the "talk-to-chatbot" set, the prefixes were generated as "talk to"+the next word, (e.g. the phrase "talk to pharmacy flashcards," would be split into a prefix $p_i=$"talk to pharmacy" and a suffix $z_i=$"flashcards"). In addition it was useful to condition the first word after "talk to" on its first letter (e.g., "pharmacy" will be conditioned on "talk to p"). This construction restricts the number of phrases sharing the same prefix to 225 (vs. 3255) while increasing the overall number of bias phrase segments by only 10-percent (10%).

The CLAS model 200 benefits from both bias conditioning and the OTF rescoring approach, as well as from their combination by permitting scalability to a large number of phrases without any degradation in accuracy. Without these features, the benefit of the context biasing can be lost when very large numbers of bias phrases are used. Nevertheless, conditioning and/or OTF rescoring can allow large sets of bias phrases, e.g., several thousand or tens of thousands or more, to be used without decreasing accuracy.

Accordingly, the CLAS model 200 includes an all-neural contextualized ASR model that incorporates contextual information by embedding full context bias phrases 114. The CLAS model 200 may apply bias conditioning to be able to handle a large set of context phrases. The model 200 outperforms standard biasing techniques by as much as 68-percent (68%) relative WER.

Figure 4:
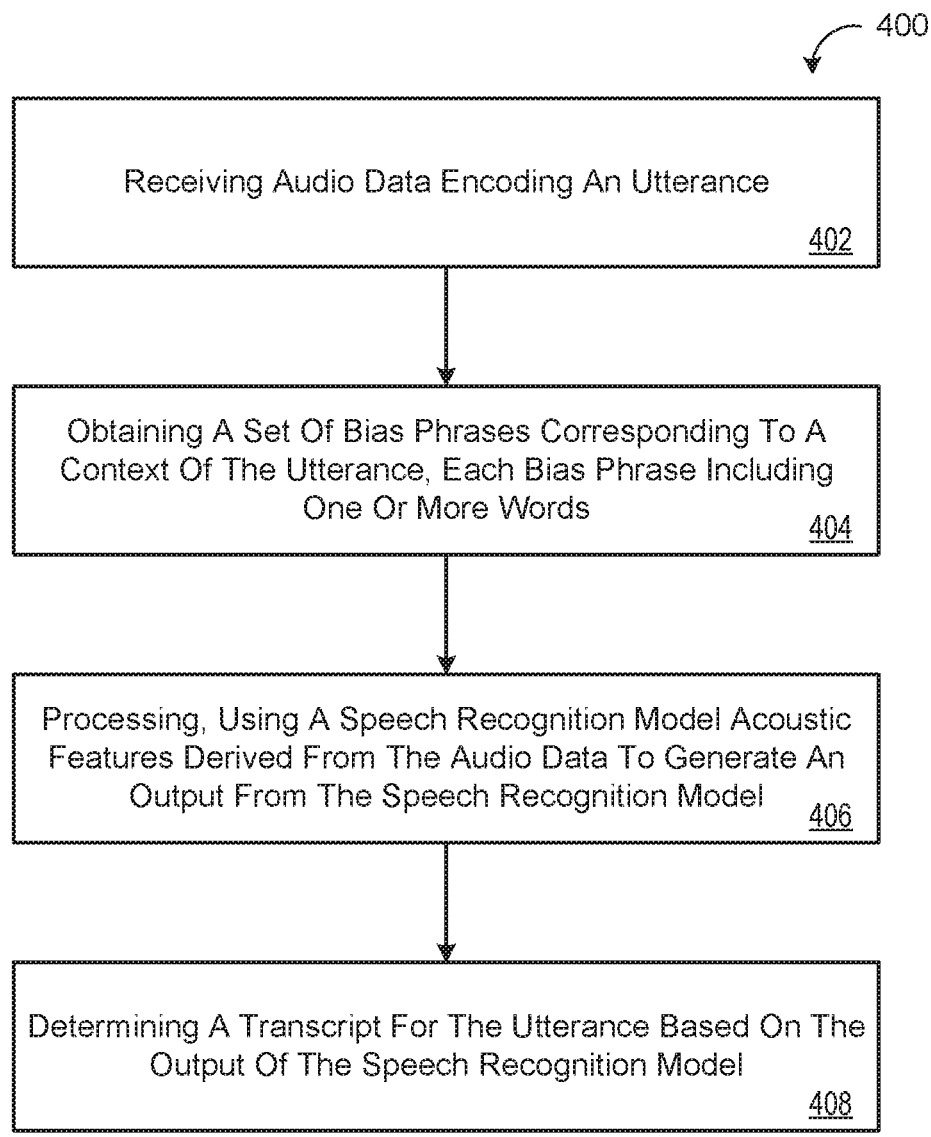
FIG. 4 is a flowchart of an example arrangement of operations for a method of incorporating contextual biasing information into a speech recognition model.

FIG. 4 is a flowchart of an exemplary arrangement of operations for a method 400 of incorporating contextual biasing information into a speech recognition model 200 to bias speech recognition toward predetermined words and phrases that are relevant to a current context in which an utterance is spoken. The method 400 may be described with reference to FIGS. 1 and 2. The user device 106 (and/or a remote server) may execute the operations for the method 400. At operation 402, the method 400 includes receiving audio data 108 encoding an utterance 104. For instance, one or more microphones of a user device 106 associated with a user 102 may record and encode the utterance 104 spoken by the user 102. At operation 404, the method 400 includes obtaining a set of bias phrases 114 corresponding to a context of the utterance 104. Each bias phrase 114 in the set of bias phrases includes one or more words.

At operation 406, the method 400 includes processing, using a speech recognition model 200, acoustic features 110 derived from the audio data 108 to generate an output 241 from the speech recognition model 200. The speech recognition model 200 includes a first encoder 210, a first attention module 218 corresponding to the first encoder 210, a bias encoder 220, a bias attention module 228 corresponding to the bias encoder 220, and a decoder 240 configured to determine likelihoods of sequences of speech elements 244 based on output of the first attention module 218 and output of the bias attention module 228. The first encoder 210 is configured to receive the acoustic features 110 derived from the audio data 108 and the bias encoder is configured to receive data 116 indicating the obtained set of bias phrases 114.

At operation 408, the method 400 includes determining a transcript 150 for the utterance 104 based on the likelihoods of sequences of speech elements 244 determined by the decoder 240. The speech elements 244 may include words, wordpieces, or graphemes. Moreover, the first encoder 210, the first attention module 218, the bias encoder 220, the bias attention module 228, and the decoder 240 are trained jointly to predict a sequence of graphemes from a sequence of acoustic feature frames.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 5:
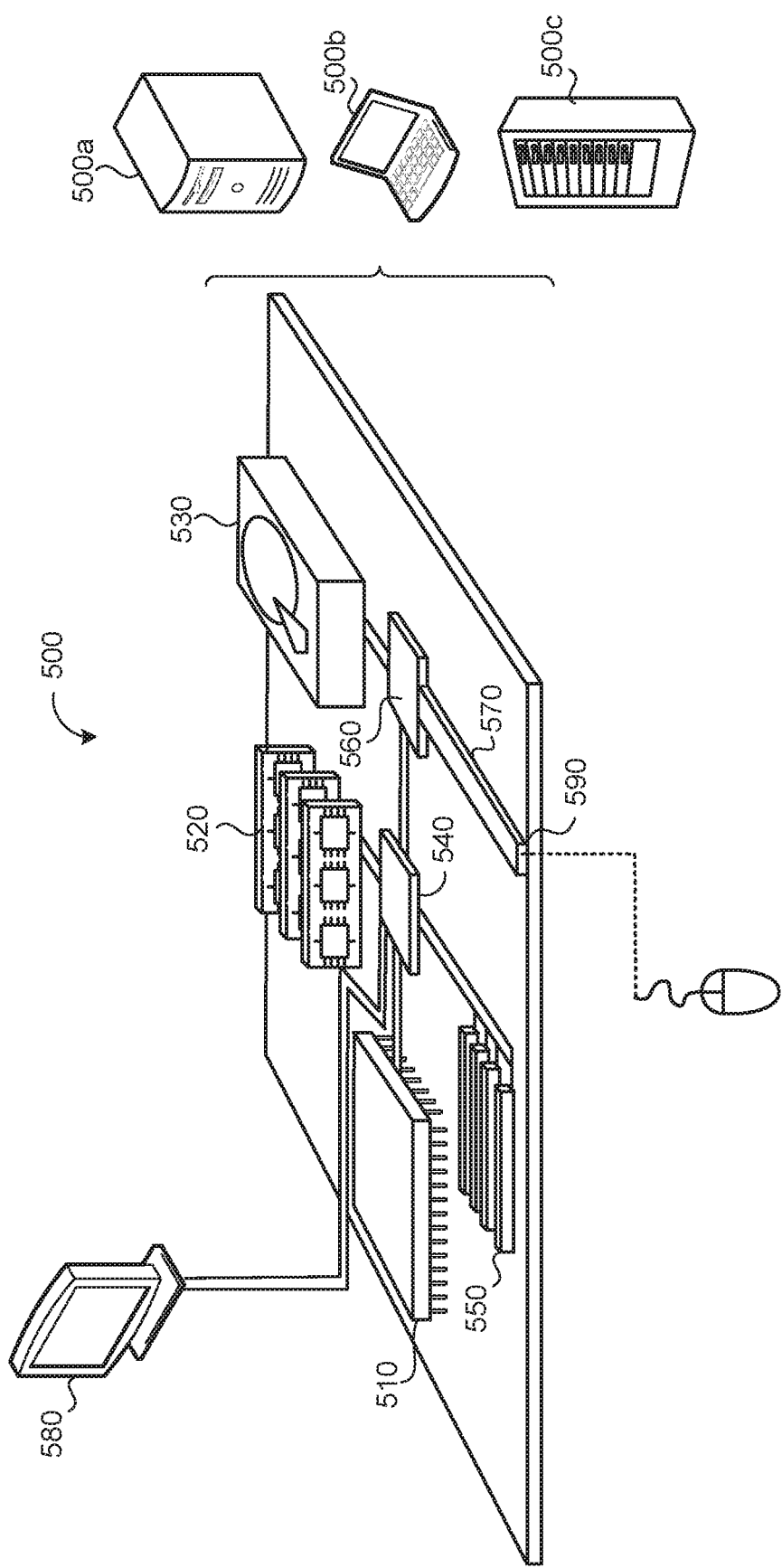
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   receiving, at data processing hardware, audio data encoding an utterance;
   obtaining, by the data processing hardware, a set of bias phrases corresponding to a context of the utterance, each bias phrase in the set of bias phrases comprising one or more words;
   processing, by the data processing hardware, using a speech recognition model, acoustic features derived from the audio data to generate an output from the speech recognition model, the speech recognition model comprising:
     a first encoder and a corresponding first attention module, the first encoder configured to receive the acoustic features;
     a bias encoder and a corresponding bias attention module, the bias encoder configured to receive data indicating the obtained set of bias phrases; and
     a decoder configured to determine likelihoods of sequences of speech elements based on output of the first attention module and output of the bias attention module;
   determining, by the data processing hardware, a transcript for the utterance based on the output from the speech recognition model;
   obtaining, by the data processing hardware, a list of bias prefixes corresponding to the bias phrases in the set of bias phrases, each bias prefix in the list of bias prefixes representing an initial portion of one or more of the bias phrases in the set of bias phrases;
   determining, by the data processing hardware, using the speech recognition model, whether a partial transcript for the utterance includes one of the bias prefixes in the list of bias prefixes; and
   when the partial transcript for the utterance includes one of the bias prefixes:
     identifying, by the data processing hardware, a subset of one or more bias phrases in the set of bias phrases that include the one of the bias prefixes included in the partial transcript; and
     enabling, by the data processing hardware, only the identified subset of the one or more bias phrases for biasing the speech recognition model.

2. The method of claim 1, wherein:
   the bias encoder is configured to encode a corresponding bias context vector for each bias phrase in the set of bias phrases; and
   the bias attention module is configured to compute attention over the bias context vectors.

3. The method of claim 2, wherein the bias attention module is configured to receive an additional bias context vector that does not correspond to any of the bias phrases in the set of bias phrases, the additional bias context vector representing an option to not bias the likelihoods of sequences of speech elements determined by the decoder toward any of the bias phrases.

4. The method of claim 2, wherein the bias encoder and the bias attention module are configured to operate with a variable number of bias phrases in the set of bias phrases that are not specified during training of the speech recognition model.

5. The method of claim 1, wherein the first encoder, the first attention module, the bias encoder, the bias attention module, and the decoder are trained jointly to predict a sequence of graphemes from a sequence of acoustic feature frames.

6. The method of claim 1, wherein the speech elements are words, wordpieces, or graphemes.

7. The method of claim 1, wherein the first encoder comprises a stacked, recurrent neural network (RNN).

8. The method of claim 1, wherein the decoder comprises a stacked, unidirectional RNN configured to compute a probability of a sequence of output tokens.

9. The method of claim 1, wherein:
   the first attention module is configured to compute attention as a function of the previous hidden state of the decoder and a full sequence of context vectors output by the first encoder for the utterance; and
   the bias attention module is configured to compute attention as a function of the previous hidden state of the decoder and a full sequence of context vectors representing the bias phrases in the set of bias phrases.

10. The method of claim 1, wherein the set of bias phrases comprises a set of contact names personalized for a particular user.

11. The method of claim 1, wherein the set of bias phrases comprises a set of media item names.

12. The method of claim 1, wherein at least one bias prefix in the list of bias prefixes comprises a first word of a corresponding bias phrase in the set of bias phrases and excludes a last word of the corresponding bias phrase.

13. The method of claim 1, further comprising:
   obtaining, by the data processing hardware, a list of bias prefixes corresponding to the bias phrases in the set of bias phrases, each bias prefix in the list of bias prefixes representing an initial portion of one or more of the bias phrases in the set of bias phrases; and adjusting, by the data processing hardware, bias-attention probabilities of the bias attention module for encoding outputs of the bias encoder for the bias phrases in the set of bias phrases based on whether one or more of the bias prefixes in the list of bias prefixes are included in a partial transcription for the utterance.

14. A system comprising:

data processing hardware; and memory hardware in communication with the data processing hardware, the memory hardware storing instructions that when executed on the data processing hardware cause the data processing hardware to perform operations comprising:

receiving audio data encoding an utterance;

obtaining a set of bias phrases corresponding to a context of the utterance, each bias phrase in the set of bias phrases comprising one or more words;

processing, using a speech recognition model, acoustic features derived from the audio data to generate an output from the speech recognition model, the speech recognition model comprising:

a first encoder and a corresponding first attention module, the first encoder configured to receive the acoustic features;

a bias encoder and a corresponding bias attention module, the bias encoder configured to receive data indicating the obtained set of bias phrases; and a decoder configured to determine likelihoods of sequences of speech elements based on output of the first attention module and output of the bias attention module;

determining a transcript for the utterance based on the output from the speech recognition model;

obtaining a list of bias prefixes corresponding to the bias phrases in the set of bias phrases, each bias prefix in the list of bias prefixes representing an initial portion of one or more of the bias phrases in the set of bias phrases;

determining, using the speech recognition model, whether a partial transcript for the utterance includes one of the bias prefixes in the list of bias prefixes; and when the partial transcript for the utterance includes one of the bias prefixes:

identifying a subset of one or more bias phrases in the set of bias phrases that include the one of the bias prefixes included in the partial transcript; and enabling only the identified subset of the one or more bias phrases for biasing the speech recognition model.

15. The system of claim 14, wherein:

the bias encoder is configured to encode a corresponding bias context vector for each bias phrase in the set of bias phrases; and the bias attention module is configured to compute attention over the bias context vectors.

16. The system of claim 15, wherein the bias attention module is configured to receive an additional bias context vector that does not correspond to any of the bias phrases in the set of bias phrases, the additional bias context vector representing an option to not bias the likelihoods of sequences of speech elements determined by the decoder toward any of the bias phrases.

17. The system of claim 15, wherein the bias encoder and the bias attention module are configured to operate with a variable number of bias phrases in the set of bias phrases that are not specified during training of the speech recognition model.

18. The system of claim 14, wherein the first encoder, the first attention module, the bias encoder, the bias attention module, and the decoder are trained jointly to predict a sequence of graphemes from a sequence of acoustic feature frames.

19. The system of claim 14, wherein the speech elements are words, wordpieces, or graphemes.

20. The system of claim 14, wherein the first encoder comprises a stacked, recurrent neural network (RNN).

21. The system of claim 14, wherein the decoder comprises a stacked, unidirectional RNN configured to compute a probability of a sequence of output tokens.

22. The system of claim 14, wherein:

the first attention module is configured to compute attention as a function of the previous hidden state of the decoder and a full sequence of context vectors output by the first encoder for the utterance; and the bias attention module is configured to compute attention as a function of the previous hidden state of the decoder and a full sequence of context vectors representing the bias phrases in the set of bias phrases.

23. The system of claim 14, wherein the set of bias phrases comprises a set of contact names personalized for a particular user.

24. The system of claim 14, wherein the set of bias phrases comprises a set of media item names.

25. The system of claim 14, wherein at least one bias prefix in the list of bias prefixes comprises a first word of a corresponding bias phrase in the set of bias phrases and excludes a last word of the corresponding bias phrase.

26. The system of claim 14, wherein the operations further comprise:

obtaining a list of bias prefixes corresponding to the bias phrases in the set of bias phrases, each bias prefix in the list of bias prefixes representing an initial portion of one or more of the bias phrases in the set of bias phrases; and adjusting bias-attention probabilities of the bias attention module for encoding outputs of the bias encoder for the bias phrases in the set of bias phrases based on whether one or more of the bias prefixes in the list of bias prefixes are included in a partial transcription for the utterance.

27. The method of claim 1, wherein the decoder is configured to determine a hidden state based on:

an embedding vector for a previous grapheme output from the speech recognition model;

a previous hidden state of the decoder;

an audio context vector output by the first attention module; and a bias context vector output by the bias attention module.

28. The system of claim 14, wherein the decoder is configured to determine a hidden state based on:

an embedding vector for a previous grapheme output from the speech recognition model;

a previous hidden state of the decoder;

an audio context vector output by the first attention module; and a bias context vector output by the bias attention module.

* * * * *